United States Patent
Kim et al.

(10) Patent No.: US 12,537,251 B2
(45) Date of Patent: Jan. 27, 2026

(54) POUCH-SHAPED BATTERY CELL MANUFACTURING METHOD INCLUDING SECONDARY SEALING AND POUCH-SHAPED BATTERY CELL MANUFACTURED THEREBY

(71) Applicant: LG Energy Solution, Ltd., Seoul (KR)

(72) Inventors: Min Jung Kim, Daejeon (KR); Tai Joon Seo, Daejeon (KR); Woo Yong Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 633 days.

(21) Appl. No.: 17/914,991

(22) PCT Filed: Nov. 12, 2021

(86) PCT No.: PCT/KR2021/016521
§ 371 (c)(1),
(2) Date: Sep. 27, 2022

(87) PCT Pub. No.: WO2022/103194
PCT Pub. Date: May 19, 2022

(65) Prior Publication Data
US 2023/0155221 A1    May 18, 2023

(30) Foreign Application Priority Data

Nov. 13, 2020 (KR) .................. 10-2020-0152143
Nov. 11, 2021 (KR) .................. 10-2021-0155191

(51) Int. Cl.
*H01M 50/184* (2021.01)
*H01M 50/105* (2021.01)
(Continued)

(52) U.S. Cl.
CPC ....... *H01M 50/184* (2021.01); *H01M 50/105* (2021.01); *H01M 50/129* (2021.01); *H01M 50/186* (2021.01)

(58) Field of Classification Search
CPC ............. H01M 50/184; H01M 50/186; H01M 50/105; H01M 50/129
See application file for complete search history.

(56) References Cited

U.S. PATENT DOCUMENTS

2010/0310930 A1    12/2010  Park et al.
2011/0318623 A1*   12/2011  Lee ................... H01M 50/264
                                                                429/100
(Continued)

FOREIGN PATENT DOCUMENTS

JP    2000100399 A    4/2000
JP    2005-116235 A   4/2005
(Continued)

OTHER PUBLICATIONS

International Search Report for PCT/KR2021/016521 mailed Feb. 21, 2022. 3 pgs.

*Primary Examiner* — Olatunji A Godo
(74) *Attorney, Agent, or Firm* — Lerner David LLP

(57) ABSTRACT

The prevent invention relates to a pouch-shaped battery cell manufacturing method including receiving an electrode assembly in a battery case made of a laminate sheet, primarily sealing an outer edge of the battery case, and secondarily sealing at least a part of the primarily sealed outer edge, wherein sealing force of a sealed portion formed after both the primary sealing and the secondary sealing are performed is low, whereby it is possible to induce the venting position and venting time of a pouch-shaped battery cell.

15 Claims, 8 Drawing Sheets

(51) Int. Cl.
*H01M 50/129* (2021.01)
*H01M 50/186* (2021.01)

(56) References Cited

U.S. PATENT DOCUMENTS

| | | | |
|---|---|---|---|
| 2014/0011078 A1 | 1/2014 | Park et al. | |
| 2017/0170437 A1* | 6/2017 | Lee | .................... H01M 50/184 |
| 2019/0393455 A1 | 12/2019 | Seo et al. | |
| 2021/0135198 A1 | 5/2021 | Obonai | |

FOREIGN PATENT DOCUMENTS

| | | |
|---|---|---|
| JP | 2011-258438 A | 12/2011 |
| JP | 5463212 B2 | 4/2014 |
| JP | 2016126826 A | 7/2016 |
| KR | 100889765 B1 | 3/2009 |
| KR | 20100099063 A | 9/2010 |
| KR | 20130140587 A | 12/2013 |
| KR | 101471765 B1 | 12/2014 |
| KR | 101520152 B1 | 5/2015 |
| KR | 101883527 B1 | 7/2018 |
| KR | 20190023649 A | 3/2019 |
| WO | 2018163636 A1 | 9/2018 |

\* cited by examiner

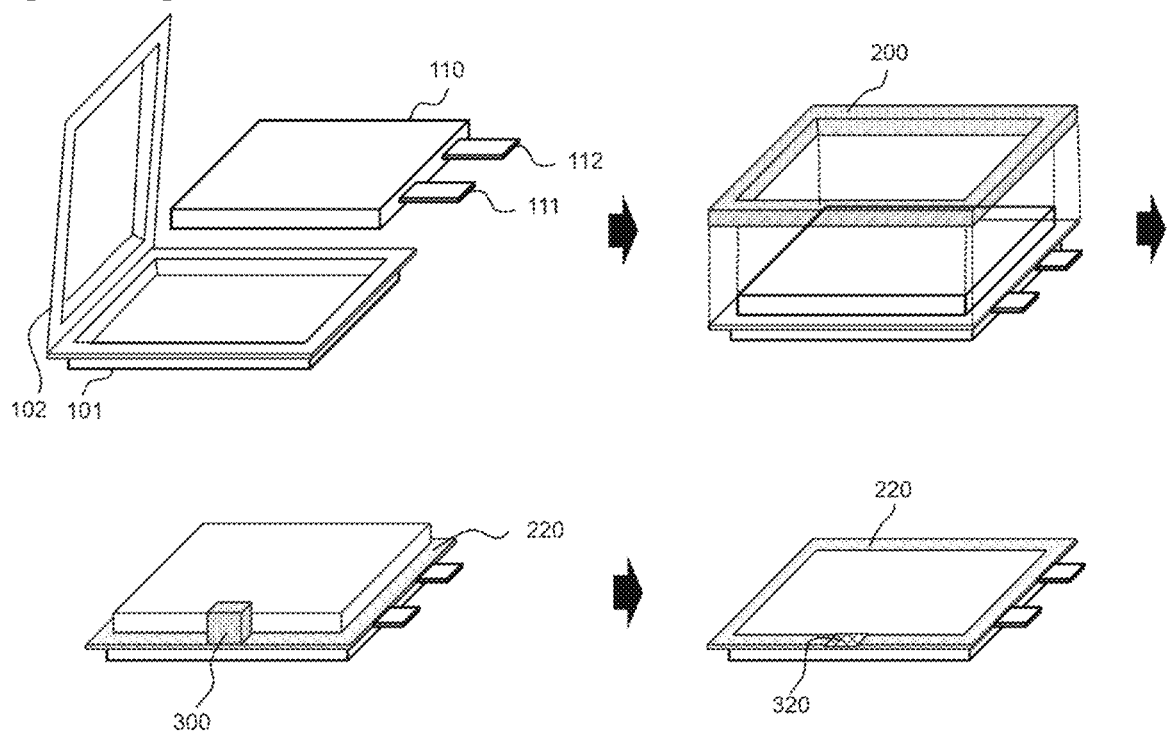
[FIG. 1]

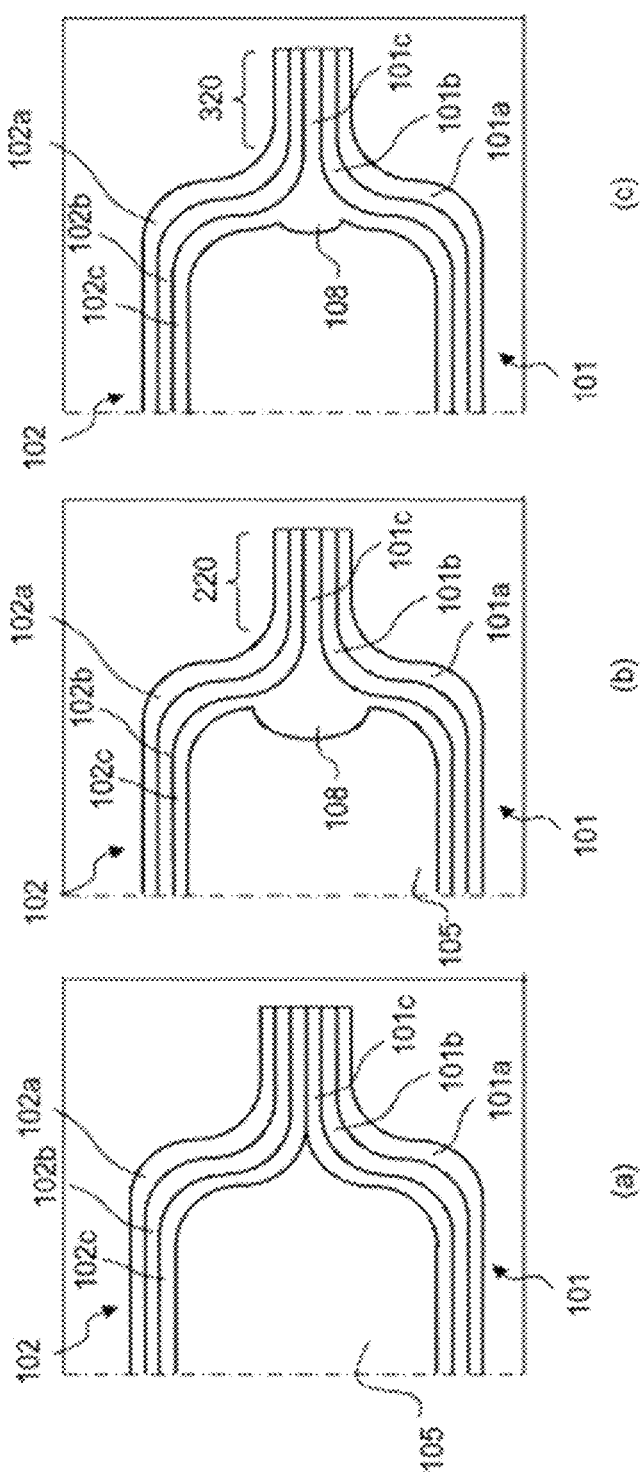
[FIG. 2]

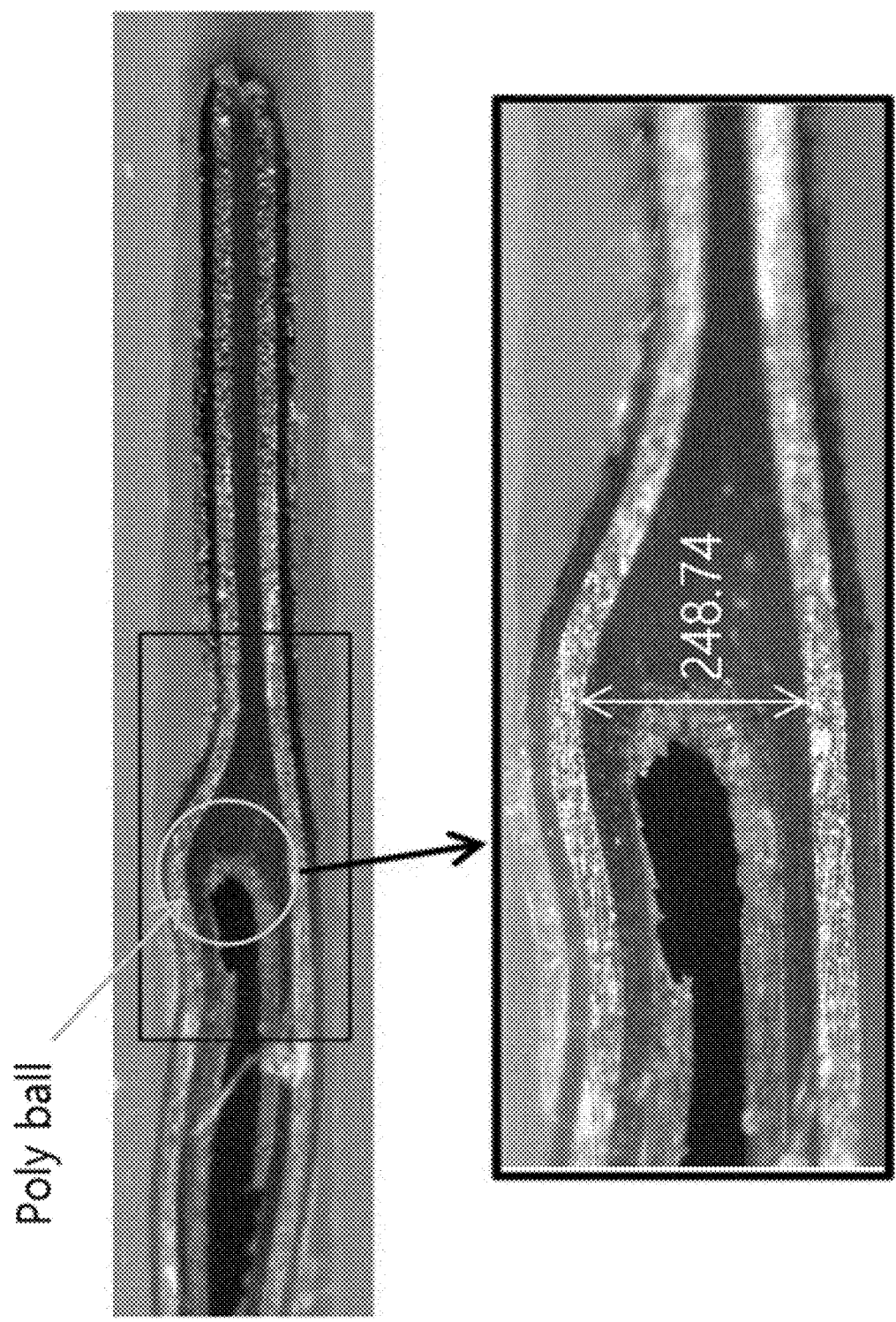
[FIG. 3]

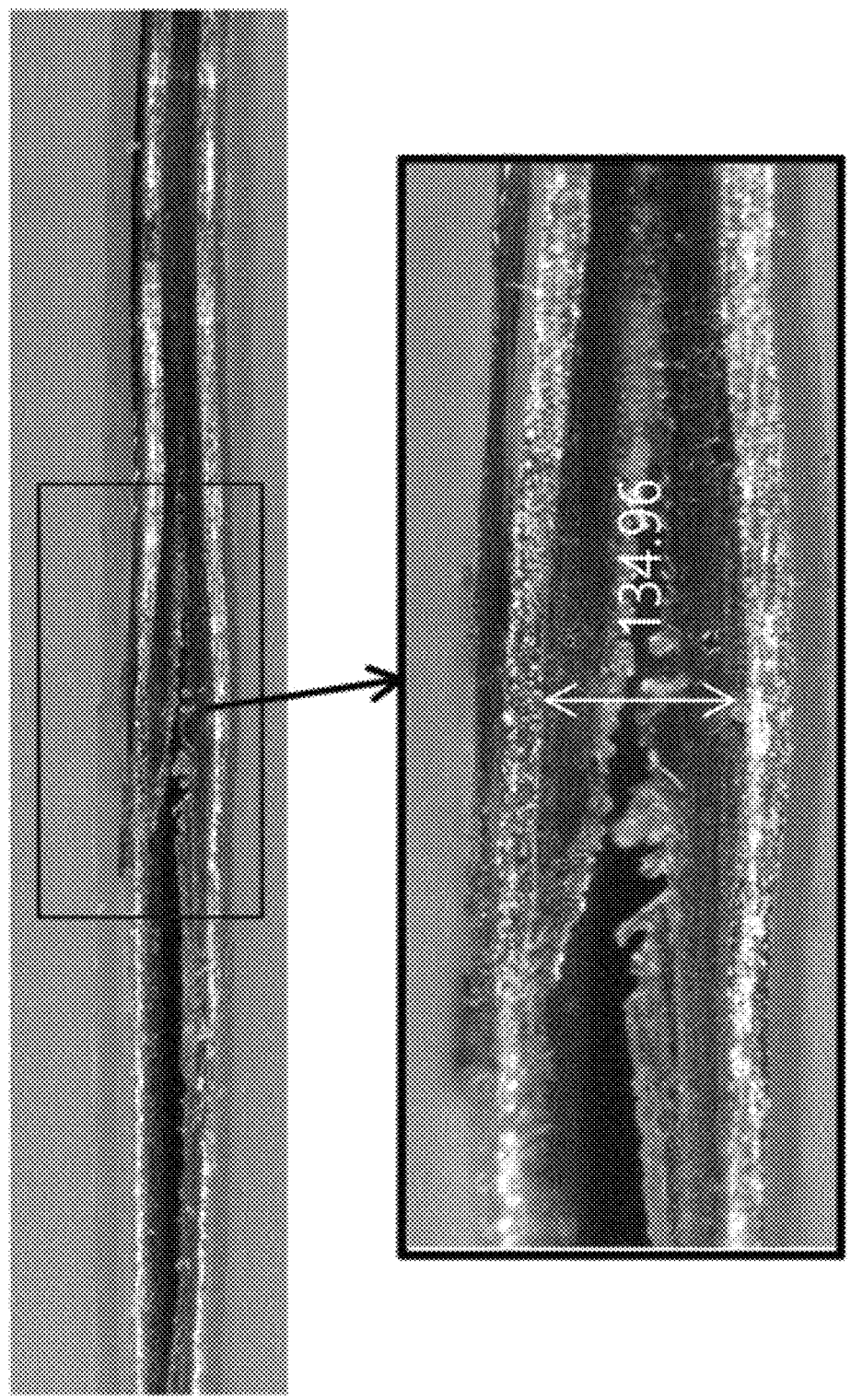
[FIG. 4]

[FIG. 5]
(a)
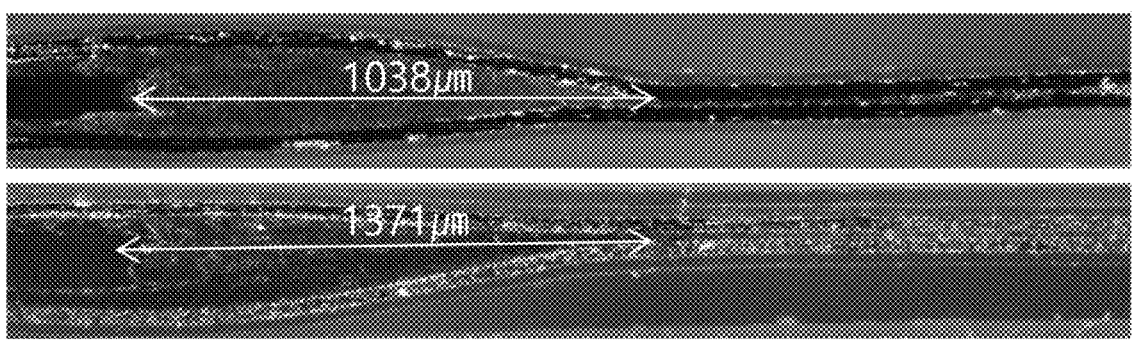
(b)
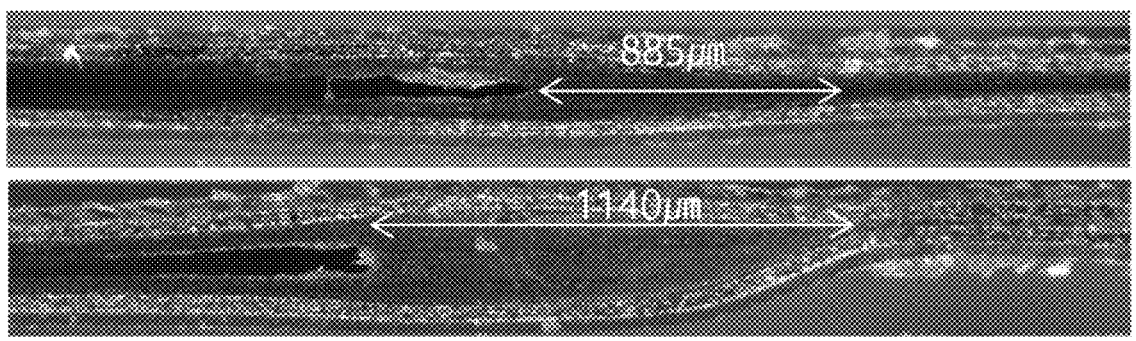

[FIG. 6]
(a)
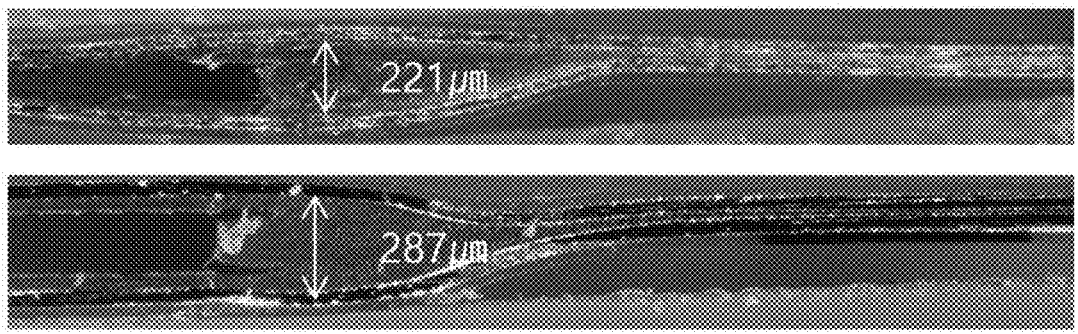
(b)
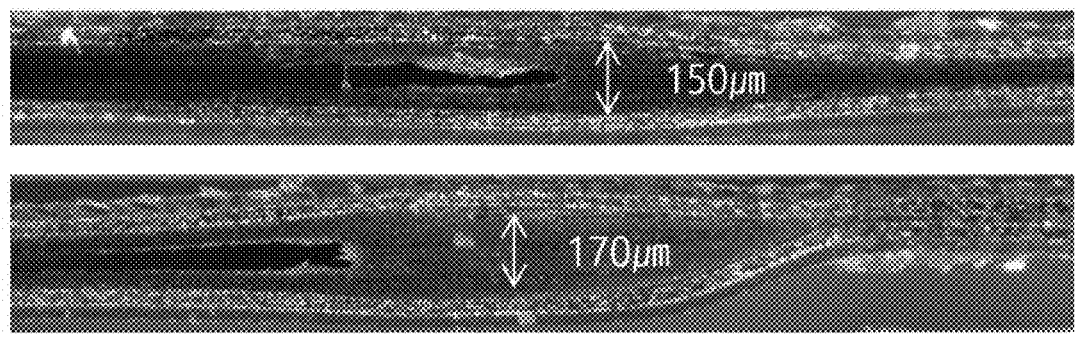

[FIG. 7]
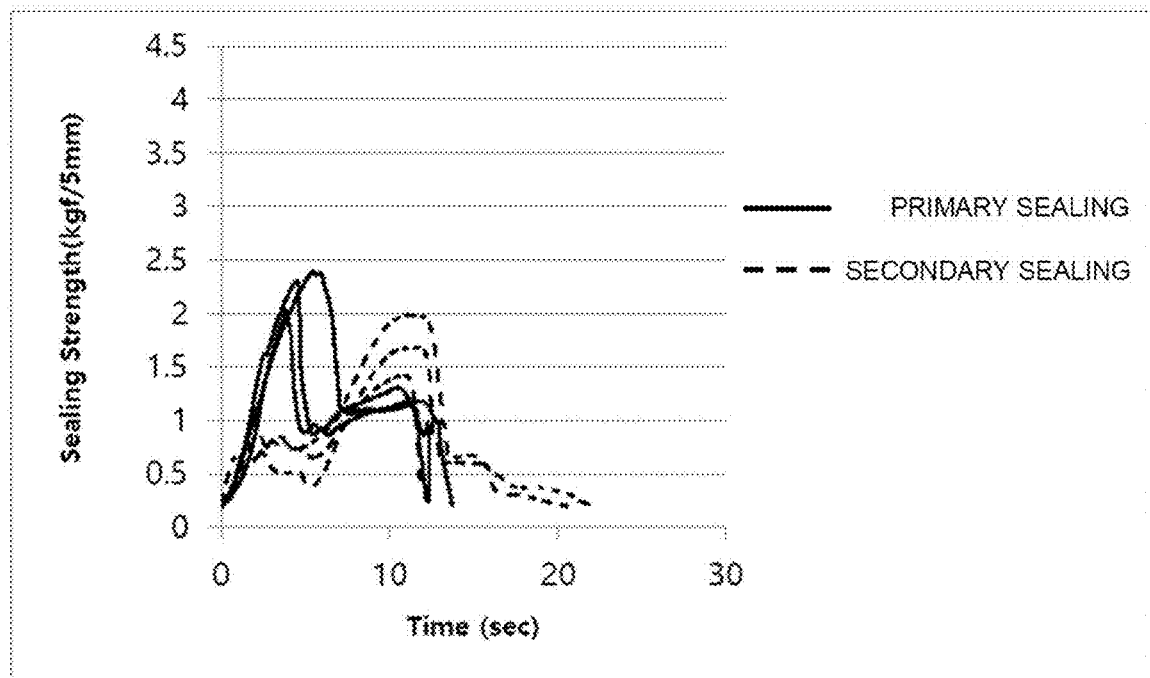
[FIG. 8]
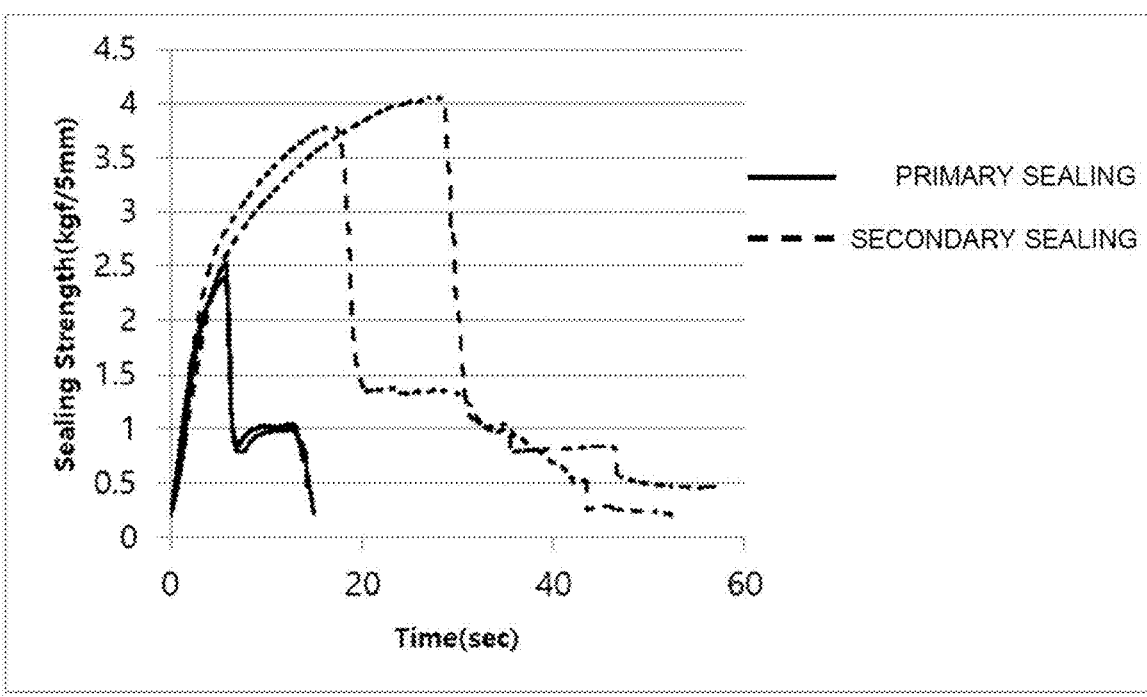

[FIG. 9]
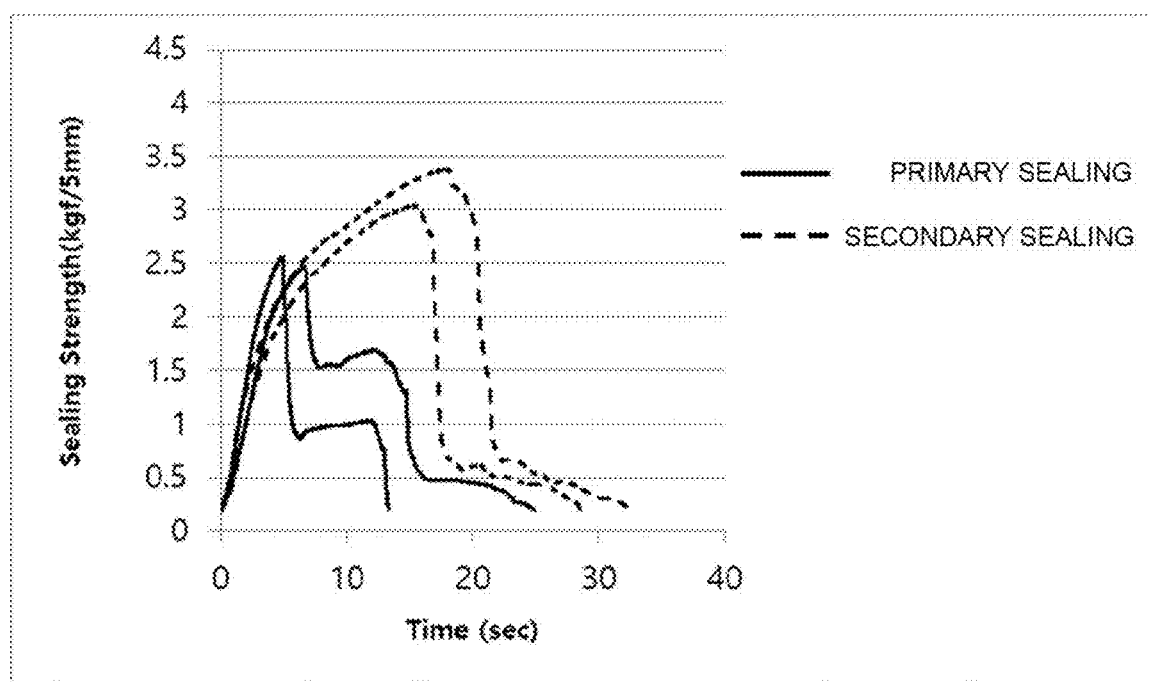

POUCH-SHAPED BATTERY CELL MANUFACTURING METHOD INCLUDING SECONDARY SEALING AND POUCH-SHAPED BATTERY CELL MANUFACTURED THEREBY

CROSS-REFERENCE TO RELATED APPLICATIONS

The present application is a national phase entry under 35 U.S.C. § 371 of International Application No. PCT/KR2021/016521, filed on Nov. 12, 2021, which claims priority from Korean Patent Application No. 10-2020-0152143 filed on Nov. 13, 2020 and Korean Patent Application No. 10-2021-0155191 filed on November the disclosures of which are incorporated herein by reference in their entireties.

TECHNICAL FIELD

The present invention relates to a pouch-shaped battery cell manufacturing method including secondary sealing and a pouch-shaped battery cell manufactured thereby. More particularly, the present invention relates to a pouch-shaped battery cell manufacturing method capable of adjusting sealing strength of a pouch-shaped battery cell such that gas is discharged from the pouch-shaped battery cell, whereby safety of the pouch-shaped battery cell is secured, before the pouch-shaped battery cell explodes when the pouch-shaped battery cell swells due to an increase in internal pressure thereof and a pouch-shaped battery cell manufactured thereby.

BACKGROUND ART

A lithium secondary battery, which is capable of being charged and discharged, has been widely used as an energy source for wireless mobile devices or wearable devices, and has also been used as an energy source for electric vehicles.

Based on the kind or shape of a sheathing member, the lithium secondary battery may be classified as a pouch-shaped secondary battery made of a laminate sheet, a cylindrical secondary battery made of a metal can, or a prismatic secondary battery made of a metal can.

The pouch-shaped secondary battery is in the spotlight as a power source for electric vehicles, which require a high-output, high-capacity energy source, since the pouch-shaped secondary battery can be manufactured in various sizes, is lightweight, and has high energy density.

In the lithium secondary battery, the temperature of an electrode assembly, an electrical connection member, etc. may be increased by heat generated during charging and discharging. At high temperatures, an electrolytic solution in the lithium secondary battery is decomposed to generate gas, which causes the lithium secondary battery to swell. For a battery pack configured such that a plurality of battery cells is fixed in a case, swollen battery cells are further pressurized in the limited case, whereby a danger of ignition and explosion is increased. If gas is discharged from a pouch-shaped battery cell before the pouch-shaped battery cell swells and explodes, it is possible to prevent the above problem.

The pouch-shaped battery cell uses a laminate sheet including an inner adhesive layer as a battery case, and the outer edge of the battery case is sealed by thermal fusion. When the laminate sheet is heated and pressed, the adhesive layer is melted, whereby a sealed portion of an upper case and a sealed portion of a lower case are coupled to each other. At this time, a lump of resin of the inner adhesive layer is formed in the coupling portion therebetween, which is called a poly ball or a polymer ball.

When the size of the poly ball is large, sealing force of the battery case is high, and therefore venting does not occur even when internal pressure is high. A means capable of adjusting sealing force as needed is necessary such that venting occurs or explosion does not occur at high pressure.

Japanese Registered Patent Publication No. 5463212 explains that, when a battery case made of a laminate film is sealed, it is possible to form sealed portions having different patterns depending on heating temperature, pressing pressure, and pressing time of a sealing tool. In addition, this document explains that at least one of the upper side and the lower side of an end of a resin gathering portion has a sectional shape sharpened in a direction toward the resin gathering portion, in which case breaking strength is lowered.

Japanese Patent Application Publication No. 2000-100399 ("the '399 patent") relates to a method of manufacturing a polymer lithium secondary battery, wherein a sealed portion is formed at the edge of a sheathing film by thermal fusion, at least a part of the sealed portion functions as a safety valve, and thermal fusion temperature of the sealed area that functions as the safety valve is lower than thermal fusion temperature of the sealed area that does not function as the safety valve.

In the '399 patent, a portion having low sealing force is formed at a part of the outer edge of a battery case, whereby it is possible to prevent rupture of the secondary battery in advance.

Korean Registered Patent Publication No. 0889765 discloses a lithium ion polymer battery configured such that a breakage side formed by ultrasonic fusion so as to be broken when internal pressure of the battery is increased is provided at one side of a pouch sheathing member, and Korean Registered Patent Publication No. 1520152 discloses a pouch-shaped secondary battery configured such that sealing strength of one of a plurality of sealed surfaces formed at the outer edge of a pouch-shaped battery cell is low, and also discloses a method of controlling pressure, heat, and temperature through adjustment of process conditions or a method of adding a material capable of increasing sealing strength to the other sealed surfaces excluding a gas discharge portion as a method of differently forming sealing strength.

Korean Registered Patent Publication No. 1883527 ("the '527 patent") uses a method of primarily performing heat sealing to apply heat and pressure using a sealing tool and heating a region that partially overlaps a primarily sealed region so as to be fused through secondary sealing, i.e. high-frequency sealing. The '527 patent is characterized in that the thickness of a case is reduced through two-step sealing, whereby the overall sealing width is reduced.

Korean Registered Patent Publication No. 1471765 ("the '765 patent") discloses a method of secondarily sealing a part of the outer edge of a pouch-shaped battery case that is primarily sealed, wherein each of primary sealing and secondary sealing is heat sealing using a sealing tool. In the '765 patent, however, a preferable temperature range of the primary sealing is about 180° C., and a preferable temperature range of the secondary sealing is 15 to 20° C., which is a room temperature range.

The reason that the temperature range of the secondary sealing is very low in the '765 patent is that it is necessary to cool and solidify a sealed region melted through the primary sealing in order to increase sealing strength.

As described above, various methods of inducing venting of a battery case in a pouch-shaped battery cell have been proposed; however, a method of reducing the size of a poly ball determining sealing strength has not yet been definitely suggested.

DISCLOSURE

Technical Problem

The present invention has been made in view of the above problems, and it is an object of the present invention to provide a pouch-shaped battery cell manufacturing method capable of adjusting sealing strength of a sealed portion of a pouch-shaped battery cell, thereby inducing venting of the pouch-shaped battery cell in a desired direction, and a pouch-shaped battery cell manufactured thereby.

Technical Solution

A pouch-shaped battery cell manufacturing method according to the present invention to accomplish the above object includes receiving an electrode assembly in a battery case made of a laminate sheet; primarily sealing the outer edge of the battery case; and secondarily sealing at least a part of the primarily sealed outer edge, wherein the primary sealing and the secondary sealing are performed by pressing an upper case and a lower case using a high-temperature sealing tool, and the sealing temperature of the primary sealing is equal to or higher than the sealing temperature of the secondary sealing. Preferably, the sealing temperature of the primary sealing may be higher than the sealing temperature of the secondary sealing.

In the pouch-shaped battery cell manufacturing method according to the present invention, the primary sealing temperature and the secondary sealing temperature may be more than 130° C. to 250° C. and 50° C. to less than 200° C., preferably 140° C. to 220° C. and 75° C. to less than 160° C., more preferably 160° C. to 200° C. and 100° C. to less than 130° C., respectively.

In the pouch-shaped battery cell manufacturing method according to the present invention, the primary sealing may be a process of sealing the entirety of the outer edge of the battery case such that the battery case is sealed.

In the pouch-shaped battery cell manufacturing method according to the present invention, the secondary sealing may be sealing at least one of at least a part of a major-axis sealed portion, at least a part of a minor-axis sealed portion, and a part of a corner of the battery case.

In the pouch-shaped battery cell manufacturing method according to the present invention, the secondary sealing may be sealing the middle of the major-axis sealed portion of the battery case.

In the pouch-shaped battery cell manufacturing method according to the present invention, the sealing time of the secondary sealing may be longer than the sealing time of the primary sealing.

In the pouch-shaped battery cell manufacturing method according to the present invention, the sealing time of the secondary sealing may be 5 seconds or more.

In the pouch-shaped battery cell manufacturing method according to the present invention, the pressing force of the secondary sealing may be higher than the pressing force of the primary sealing.

In addition, the present invention provides a pouch-shaped battery cell manufactured by the pouch-shaped battery cell manufacturing method.

In the battery cell according to the present invention, the pouch-shaped battery cell may include a battery case made of a laminate sheet including an outer resin layer, metal layer, and an inner adhesive layer, and the thickness of a poly ball in a sealed portion formed after both primary sealing and secondary sealing are performed may be 60 to 70% of the thickness of a poly ball in a sealed portion formed after only the primary sealing is performed.

Here, the thickness of the poly ball means the thickness of the thickest part of the portion at which the poly ball is formed when the section of the pouch-shaped battery cell is observed.

In addition, the thickness of the poly ball in the primarily sealed portion may be 220 µm to 300 µm, and the thickness of the poly ball in the secondarily sealed portion may be 130 µm to 170 µm.

The pouch-shaped battery cell may include a battery case made of a laminate sheet including an outer resin layer, a metal layer, and an inner adhesive layer, and the thicknesses of the inner adhesive layers in the sealed portion formed after primary sealing and secondary sealing at the connection portion at which the sealed portion formed after primary sealing and secondary sealing is connected to the electrode assembly receiving portion may be less than 200% of the thickness of one inner adhesive layer outside the sealed portion.

In the battery cell according to the present invention, the sealing force of the sealed portion formed after both primary sealing and secondary sealing are performed may be lower than the sealing force of the sealed portion formed after only the primary sealing is performed.

In addition, the present invention may provide all possible combinations of the above solving means.

Advantageous Effects

As is apparent from the above description, in the present invention, a part of a sealed portion of a pouch-shaped battery cell is doubly sealed in order to adjust sealing force of the doubly sealed part. Also, in the present invention, a part of the sealed portion of the pouch-shaped battery cell is doubly sealed in order to reduce the size of a poly ball formed in the doubly sealed part. Sealing force is reduced along the part in which the size of the poly ball is reduced, whereby it is possible to control the venting position and venting time of the pouch-shaped battery cell.

Since self-venting may be induced before the pouch-shaped battery cell explodes, as described above, it is possible to prevent the pouch-shaped battery cell from being ignited in a high-temperature environment.

DESCRIPTION OF DRAWINGS

FIG. 1 shows a process of manufacturing a pouch-shaped battery cell according to the present invention.

FIG. 2 is a partial vertical sectional view of a pouch-shaped battery case.

FIG. 3 is a sectional photograph of a battery case after completion of primary sealing.

FIG. 4 is a sectional photograph of the battery case after completion of secondary sealing.

FIG. 5 shows the length of a temporary attachment area by a poly ball after primary sealing (a) and secondary sealing (b).

FIG. 6 shows the thickness of the poly ball after primary sealing (a) and secondary sealing (b).

FIG. 7 shows sealing force measurement profiles of Sample 1.

FIG. 8 shows sealing force measurement profiles of Sample 2.

FIG. 9 shows sealing force measurement profiles of Sample 3.

BEST MODE

Now, preferred embodiments of the present invention will be described in detail with reference to the accompanying drawings such that the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims, singular forms are intended to include plural forms unless mentioned otherwise.

Also, in the description of the invention and the claims, "or" includes "and" unless mentioned otherwise. Therefore, "including A or B" means three cases, namely, the case including A, the case including B, and the case including A and B.

The present invention relates to a pouch-shaped battery cell manufacturing method of sealing the outer edge of a battery case by applying heat and pressure thereto, wherein, in order to accomplish an object to secure force of sealing the outer edge of the battery case and to accomplish an object to induce venting at a specific portion of the outer edge, primary sealing and secondary sealing are performed. Also, in the present invention, it is possible to adjust sealing force through primary sealing and secondary sealing.

It is generally known that, in sealing a pouch-shaped battery, sealing force is increased when the number of times of sealing is increased. The present invention has been derived based on the fact that it is possible to control sealing force by controlling the size of a poly ball and to reduce sealing force through secondary sealing.

That is, a primarily sealed portion having high sealing force may be formed at the entire outer edge of the battery case through the primary sealing, and a part of the primarily sealed portion may be deformed to form a secondarily sealed portion having low sealing force through the secondary sealing. Also, in the present invention, it is possible to derive a construction for increasing sealing force by changing secondary sealing conditions.

Specifically, the pouch-shaped battery cell manufacturing method according to the present invention includes a step of receiving an electrode assembly in a battery case made of a laminate sheet, a step of primarily sealing the outer edge of the battery case, and a step of secondarily sealing at least a part of the primarily sealed outer edge.

The laminate sheet may be configured to have a layered structure in which an outer resin layer, an air and moisture blocking metal layer, and a thermally fusible inner adhesive layer are stacked, and may further include an adhesive layer between the outer resin layer and the metal layer and between the metal layer and the inner adhesive layer.

It is required for the outer resin layer to exhibit excellent tolerance to an external environment, and therefore more than predetermined tensile strength and weather resistance are necessary. In this aspect, a polymer resin constituting the outer resin layer may include polyethylene naphthalate (PEN), polyethylene terephthalate (PET), or oriented nylon, which exhibits excellent tensile strength and weather resistance.

The metal layer may be made of aluminum (Al) or an aluminum alloy in order to exhibit a function of improving strength of the battery case in addition to a function of preventing introduction of foreign matter, such as gas and moisture, or leakage of an electrolytic solution. Examples of the aluminum alloy may include alloy numbers 8079, 1N30, 8021, 3003, 3004, 3005, 3104, and 3105. These materials may be used alone or in the form of a combination of two or more thereof.

A polymer resin that exhibits thermal fusibility, has low hygroscopicity to the electrolytic solution, and is not expanded or eroded by the electrolytic solution may be used as the inner adhesive layer. Specifically, the inner adhesive layer may be made of cast polypropylene (CPP).

FIG. 1 shows a process of manufacturing a pouch-shaped battery cell according to the present invention.

Referring to FIG. 1, an electrode assembly 110 is received in a battery case 101, and primary sealing of sealing the entirety of the outer edge of the battery case 101 using a primary sealing tool 200 is performed to form a primarily sealed portion 220. Subsequently, a part of the primarily sealed portion 220 is secondarily sealed using a secondary sealing tool 300 to form a secondarily sealed portion 320.

The primary sealing is a process of sealing the battery case in order to block movement of a material between the outside and the inside of the battery case, wherein the entirety of the outer edge of the battery case is sealed.

A pouch-shaped battery case may be constituted by a first case having an electrode assembly receiving portion formed therein and a second case coupled to the upper part of the first case. Alternatively, the electrode assembly receiving portion may be formed in both the first case and the second case.

The first case and the second case may be separated from each other, or may be bent in the state in which corresponding ends thereof are coupled to each other such that the first case and the second case are sealed.

In the battery case of FIG. 1, an electrode assembly receiving portion is formed in each of a first case 101 and a second case 102, and the first case 101 and the second case 102 are bent in a state of being coupled to each other, wherein no sealed portion may be formed at a bent portion, or a narrower sealed portion than the remainder of the outer edge may be formed at the bent portion.

The primary sealing tool 200 shown in FIG. 1 is configured to have a quadrangular ring shape in order to seal the entirety of the outer edge of the battery case. However, the present invention is not limited thereto. FIG. 1 shows that the primary sealing tool and the secondary sealing tool are disposed only above the sealed portions of the battery case, and a primary lower sealing tool and a secondary lower sealing tool disposed under the sealed portions of the battery case so as to overlap the primary sealing tool and the secondary sealing tool are omitted. Each of the primary lower sealing tool and the secondary lower sealing tool may have a size and a shape corresponding to the size and the shape of a corresponding one of the primary sealing tool and the secondary sealing tool, or may be formed in the shape of a support larger than a corresponding one of the primary sealing tool and the secondary sealing tool.

In addition, the primary sealing tool and the primary lower sealing tool may be disposed above and below only one of four outer edge sealed portions of the battery case in a straight line in order to seal only the sealed portion.

In the primary sealing and the secondary sealing, an upper case and a lower case are pressed using the high-temperature sealing tools. Sealing temperature of the primary sealing is equal to or higher than sealing temperature of the secondary sealing.

Specifically, the primary sealing temperature and the secondary sealing temperature may be more than 130° C. to 250° C. and 50° C. to less than 200° C., preferably 140° C. to 220° C. and 75° C. to less than 160° C., more preferably 160° C. to 200° C. and 100° C. to less than 130° C., respectively.

Alternatively, the primary sealing temperature may be 160° C. to 200° C., and the secondary sealing temperature may be 100° C. to 200° C., preferably 100° C. to 140° C.

In the primary sealing step, the inner adhesive layers of the first case and the second case are melted and coupled to each other. The primary sealing temperature may be equal to or higher than the melting temperature of the adhesive layers.

When the outer edge of the battery case is sealed at high temperature, as described above, a poly ball, which is a lump of polymer resins constituting the inner adhesive layers, is formed at the portion of the interface between the first case and the second case that is connected to the electrode assembly receiving portion.

When the size of the poly ball is increased, venting pressure of the battery case is increased. In the present invention, therefore, a sealed portion having high coupling force is formed at the entirety of the outer edge of the battery case through high-temperature primary sealing.

Meanwhile, in the present invention, a portion having low sealing force may be arbitrarily formed at a part of the sealed portion as technology for inducing the venting position and venting time of the pouch-shaped battery cell. In contrast, control is possible through the construction according to the present invention even in the case in which high sealing force is necessary.

Specifically, low-temperature secondary sealing is performed on a part of the primarily sealed portion, which has already been sealed, at which venting is desired to occur in order to form a venting portion having low sealing force.

In the secondary sealing step, the size of the poly ball is reduced, whereby the sealing force of the sealed portion on which secondary sealing has been performed is reduced.

In general, venting more easily occurs at major-axis sealed portions of the pouch-shaped battery cell than minor-axis sealed portions of the pouch-shaped battery cell. In the case in which venting is induced to occur at any one of four sealed portions of the battery case, the secondary sealing may be performed as a process of further sealing at least one of the major-axis sealed portions of the battery case.

In the case in which the venting portion is formed so as to be narrow, pressure may be more concentrated, whereby venting may rapidly occur. In addition, when secondary sealing is performed at the middle of the major-axis sealed portion of the battery case, venting may be induced to most rapidly occur, in consideration of the fact that the internal pressure of the battery cell is concentrated on the middle of the major-axis sealed portion.

In a concrete example, secondary sealing time may be longer than primary sealing time. Specifically, the secondary sealing time may be 5 seconds or more, more specifically 8 seconds or more. In addition, the primary sealing time may be 4 seconds or less, specifically 3 seconds or less.

Since pressing is performed at high temperature in primary sealing, as described above, the inner adhesive layers are melted to such an extent that sealability is sufficiently secured even though pressing time is short. Since pressing is performed at low temperature in secondary sealing, in contrast, it is necessary to secure time for which the poly ball is melted and widely spread. For this reason, it is necessary to perform pressing for a relatively long time. A portion of the poly ball that will form a temporary attachment area is widely spread along the case through secondary sealing. Since the temperature is relatively low, however, no temporary attachment area is formed, and only the thickness of the poly ball is reduced, whereby sealing force is reduced.

In another concrete example, pressing force of the secondary sealing may be higher than pressing force of the primary sealing. That is, in the secondary sealing in which pressing is performed at low temperature, sealing is performed using higher pressing force than the primary sealing, whereby it is possible to reduce the size of the poly ball.

In order to explain a change in the sealed portions according to primary sealing and secondary sealing according to the present invention, a partial vertical sectional view of a pouch-shaped battery case is shown in FIG. 2.

Referring to FIG. 2, the pouch-shaped battery case is constituted by a first case 101 and a second case 102, which are manufactured by shaping laminate sheets configured to have structures in which outer resin layers 101a and 102a, metal layers 101b and 102b, and inner adhesive layers 101c and 102c are sequentially stacked.

FIG. 2(a) shows the pouch-shaped battery case before sealing, FIG. 2(b) shows the state in which the pouch-shaped battery case is primarily sealed, and FIG. 2(c) shows the state in which the pouch-shaped battery case is secondarily sealed. FIG. 2(c) shows the case in which sealing force is reduced through secondary sealing.

Specifically, in a primarily sealed portion 220 shown in FIG. 2(b), the inner adhesive layer 101c of the first case 101 and the inner adhesive layer 102c of the second case 102 are melted and coupled to each other so as to be integrated. In addition, since the inner adhesive layers 101c and 102c are pressed by the primary sealing tool, the sum of the thicknesses of the inner adhesive layers 101c and 102c shown in FIG. 2(b) is less than the sum of the thicknesses of the inner adhesive layers shown in FIG. 2(a).

That is, the inner adhesive layers in the primarily sealed portion 220 are pressed by the primary sealing tool, whereby the inner adhesive layers are pushed in a direction toward an electrode assembly receiving portion 105 to form a poly ball 108.

In addition, the secondary sealing is a process of pressing the primarily sealed portion 220 at a low temperature to form a secondarily sealed portion 320, and the size of the poly ball 108 in the secondarily sealed portion 320 is remarkably reduced.

Consequently, sealing force of the secondarily sealed portion 320 is reduced.

The reason for this is that pressing force is applied in the state in which the inner adhesive layers and the poly ball are heated by the temperature of the secondary sealing tool, whereby the poly ball is widely spread.

A pouch-shaped battery cell manufactured by the pouch-shaped battery cell manufacturing method includes a primarily sealed portion formed by only the primary sealing and a secondarily sealed portion formed by the primary sealing and the secondary sealing, wherein the thickness of the inner adhesive layer in the secondarily sealed portion at the connection portion at which the secondarily sealed portion is connected to the electrode assembly receiving portion may be less than 200% of the thickness of one inner adhesive layer outside the sealed portion.

In addition, since sealing strength of the secondarily sealed portion is lower than sealing strength of the primarily sealed portion, venting may occur first in the secondarily sealed portion when the internal pressure of the pouch-shaped battery cell is increased.

Hereinafter, the present invention will be described with reference to the following examples. These examples are provided only for easier understanding of the present invention and should not be construed as limiting the scope of the present invention.

Comparative Example

Three sets of battery cases, each of which was made of a laminate sheet including a denatured polyolefin layer, which is a kind of thermally fusible resin, as an inner adhesive layer, an aluminum layer, as a metal layer, and polyethylene terephthalate, as an outer resin layer, were prepared as Sample 1, Sample 2, and Sample 3. The sum of thicknesses of an upper case and a lower case of the battery case of Sample 1 was 137 μm in the state in which the outer edge of the upper case and the outer edge of the lower case were disposed so as to face each other.

In order to seal the outer edge of the upper case and the outer edge of the lower case of the battery case of Sample 1, a pressing force of 0.03 kgf/cm$^2$ was applied for 3 seconds at a sealing temperature of 185° C. to perform primary sealing.

A photograph of the battery case of Sample 1 after completion of the primary sealing is shown in FIG. 3. Referring to FIG. 3, the measured height of a poly ball was 248.74 μm.

Changes in the length of a temporary attachment area and the thickness of a poly ball of each of a plurality of battery cases were observed under the same conditions as Samples 1, 2, and 3. FIG. 5 shows the length of a temporary attachment area by a poly ball after primary sealing (a) and secondary sealing (b), and FIG. 6 shows the thickness of the poly ball after primary sealing (a) and secondary sealing (b).

Referring to FIGS. 3 to 6, it was observed that the length of the temporary attachment area was not greatly changed even after the primary sealing and the secondary sealing were performed. However, it was observed that the thickness of the poly ball was changed after the primary sealing and the secondary sealing were performed, whereby sealing force was changed.

Referring to FIGS. 3 to 6, the thickness of the poly ball in the primarily sealed portion was 220 μm to 290 μm, and the thickness of the poly ball in the secondarily sealed portion was 150 μm to 170 μm.

Primary sealing was performed on Sample 2 and Sample 3 under the same conditions as the primary sealing of Sample 1.

Sealing force profiles obtained by measuring sealing force of Sample 1 three times are shown with solid lines in FIG. 7, sealing force profiles obtained by measuring sealing force of Sample 2 twice are shown with solid lines in FIG. 8, and sealing force profiles obtained by measuring sealing force of Sample 3 twice are shown with solid lines in FIG. 9.

Table 1 below shows the average of peak values of the sealing force profiles of each sample. In Table 1, for Comparative Example, only primary sealing was performed for Sample 1, Sample 2, and Sample 3.

Example 1

Sample 1 of Comparative Example was prepared, and a force of 40 kgf/cm$^2$ was applied to a part of the primarily sealed outer edge for 8 seconds at a sealing temperature of 130° C. as secondary sealing.

A photograph of the battery case of Sample 1 after completion of the secondary sealing is shown in FIG. 4.

Referring to FIG. 4, the measured height of the poly ball was 134.96 μm. Consequently, it can be seen that the size of the poly ball after the secondary sealing was performed was about 45% less than the size of the poly ball after only the primary sealing was performed.

Sealing force profiles obtained by measuring sealing force of Sample 1 after the secondary sealing three times are shown with dotted lines in FIG. 7, and Table 1 below shows the average of peak values of the sealing force profiles measured three times.

Example 2

Sample 2 of Comparative Example was prepared, and secondary sealing was performed for 3 seconds at a sealing temperature of 185° C. without pressing.

Sealing force profiles obtained by measuring sealing force of Sample 2 twice after the secondary sealing are shown with dotted lines in FIG. 8, and Table 1 below shows the average of peak values of the sealing force profiles measured twice.

Example 3

Sample 3 of Comparative Example was prepared, and a force of 40 kgf/cm$^2$ was applied for 3 seconds at a sealing temperature of 185° C. as secondary sealing.

Sealing force profiles obtained by measuring sealing force of Sample 3 twice after the secondary sealing are shown with dotted lines in FIG. 9, and Table 1 below shows the average of peak values of the sealing force profiles measured twice.

In order to measure sealing forces of the battery cases manufactured according to Comparative Example and Examples 1 to 3, peel strength measurement experiments were performed as follows, and the results are shown in Table 1 below.

Experimental Example

Measurement of Peel Strength

The battery cases manufactured according to Comparative Example and Examples 1 to 3 were peeled at a speed of 250 mm/min and an angle of 180 degrees using a TA instrument (Model name: Texture Analyzer) of Stable Micro System Company, and force necessary at this time was measured.

TABLE 1

|  | Comparative Example | | | Example 1 | Example 2 | Example 3 |
| --- | --- | --- | --- | --- | --- | --- |
|  | Sample 1 | Sample 2 | Sample 3 | Sample 1 | Sample 2 | Sample 3 |
| Sealing force (kgf/cm²) | 2.17 | 2.45 | 2.51 | 1.70 | 3.92 | 3.20 |

Referring to Table 1 above, it can be seen that, for Sample 1, sealing force when only the primary sealing was performed was higher than sealing force after the secondary sealing was further performed.

Meanwhile, it can be seen that, for Sample 2 and Sample 3, sealing force after the secondary sealing was further performed was higher than sealing force when only the primary sealing was performed.

Consequently, it can be seen that, in the case in which secondary sealing is performed at a temperature lower than the primary sealing temperature, as in the present invention, sealing force is less than sealing force when only primary sealing is performed. The reason for this is that, in the case in which primary sealing and secondary sealing are performed and the secondary primary sealing temperature is lower than the primary sealing temperature, the size of the poly ball is remarkably reduced, as shown in FIGS. 3 and 4, whereby sealing force is reduced.

As can be seen from Example 2 and Example 3, when the secondary sealing temperature is equal to or higher than the primary sealing temperature, sealing force is increased, from which it can be seen that temperature has a greater influence than pressing.

Those skilled in the art to which the present invention pertains will appreciate that various applications and modifications are possible within the category of the present invention based on the above description.

DESCRIPTION OF REFERENCE SYMBOLS

101: First case
101a, 102a: Outer resin layers
101b, 102b: Metal layers
101c, 102c: Inner adhesive layers
102: Second case
105: Electrode assembly receiving portion
108: Poly ball
110: Electrode assembly
111: Positive electrode terminal
112: Negative electrode terminal
200: Primary sealing tool
220: Primarily sealed portion
300: Secondary sealing tool
320: Secondarily sealed portion

INDUSTRIAL APPLICABILITY

The present invention relates to a pouch-shaped battery cell manufacturing method including receiving an electrode assembly in a battery case made of a laminate sheet, primarily sealing an outer edge of the battery case, and secondarily sealing at least a part of the primarily sealed outer edge, wherein sealing force of a sealed portion formed after both the primary sealing and the secondary sealing are performed is low, whereby it is possible to induce the venting position and venting time of a pouch-shaped battery cell, and therefore the present invention has industrial applicability.

The invention claimed is:

1. A pouch-shaped battery cell manufacturing method comprising:
   receiving an electrode assembly in a battery case made of a laminate sheet;
   primarily sealing an outer edge of the battery case at a first sealing temperature; and
   secondarily sealing at least a part of the primarily sealed outer edge at a second sealing temperature, wherein
   the primary sealing and the secondary sealing are performed by pressing a first case and a second case using a high-temperature sealing tool, and
   the first sealing temperature is greater than the second sealing temperature,
   wherein a size of a poly ball formed during the primary sealing step is reduced in the secondary sealing step.

2. The pouch-shaped battery cell manufacturing method according to claim 1, wherein;
   the first sealing temperature is between about 130° C. and about 250° C., and
   the second sealing temperature is between about 50° C. and about 200° C.

3. The pouch-shaped battery cell manufacturing method according to claim 1, wherein;
   the primary sealing includes sealing an entirety of the outer edge of the battery case such that the battery case is sealed.

4. The pouch-shaped battery cell manufacturing method according to claim 1, wherein;
   the secondary sealing includes sealing at least one of at least a part of a major-axis sealed portion, at least a part of a minor-axis sealed portion, and a part of a corner of the battery case.

5. The pouch-shaped battery cell manufacturing method according to claim 1, wherein;
   the secondary sealing includes sealing a middle of a major-axis sealed portion of the battery case.

6. The pouch-shaped battery cell manufacturing method according to claim 1, wherein;
   a sealing time of the secondary sealing is longer than a sealing time of the primary sealing.

7. The pouch-shaped battery cell manufacturing method according to claim 6, wherein;
   the sealing time of the secondary sealing is about 5 seconds or more.

8. The pouch-shaped battery cell manufacturing method according to claim 1, wherein;
   a pressing force of the secondary sealing is greater than a pressing force of the primary sealing.

9. A pouch-shaped battery cell manufactured by the pouch-shaped battery cell manufacturing method according to claim 1.

10. The pouch-shaped battery cell according to claim 9, wherein;
the pouch-shaped battery cell comprises a battery case made of a laminate sheet comprising an outer resin layer, a metal layer, and an inner adhesive layer, and
the poly ball formed by the inner adhesive layer in a sealed portion after the secondary sealing is performed defines a thickness measuring 60 to 70% of a thickness of the poly ball in the sealed portion formed after only the primary sealing is performed.

11. The pouch-shaped battery cell according to claim 9, wherein;
the pouch-shaped battery cell comprises a battery case made of a laminate sheet comprising an outer resin layer, a metal layer, and an inner adhesive layer, and
a thickness of a poly ball in a sealed portion formed after only primary sealing is performed is between about 220 μm and about 290 μm, and
a thickness of the poly ball formed by the inner adhesive layer in a sealed portion after the secondary sealing is further performed is between about 150 μm and about 170 μm.

12. The pouch-shaped battery cell according to claim 9, wherein; a sealing force of a sealed portion formed after both primary sealing and secondary sealing are performed is lower than a sealing force of a sealed portion formed after only the primary sealing is performed.

13. The pouch-shaped battery cell according to claim 1, wherein the secondary sealing is performed on a part of a primarily sealed portion which has already been sealed to form a venting portion having a low sealing force.

14. A pouch-shaped battery cell manufacturing method comprising:
receiving an electrode assembly in a battery case made of a laminate sheet;
primarily sealing an outer edge of the battery case at a first sealing temperature; and
secondarily sealing at least a part of the primarily sealed outer edge at a second sealing temperature, wherein
the primary sealing and the secondary sealing are performed by pressing a first case and a second case using a high-temperature sealing tool, and
the first sealing temperature is greater than the second sealing temperature,
wherein the pouch-shaped battery cell comprises a battery case made of a laminate sheet comprising an outer resin layer, a metal layer, and an inner adhesive layer, and
a poly ball formed by the inner adhesive layer in a sealed portion after the secondary sealing is performed defines a thickness measuring 60 to 70% of a thickness of the poly ball in the sealed portion formed after only the primary sealing is performed.

15. A pouch-shaped battery cell manufacturing method comprising:
receiving an electrode assembly in a battery case made of a laminate sheet;
primarily sealing an outer edge of the battery case at a first sealing temperature; and
secondarily sealing at least a part of the primarily sealed outer edge at a second sealing temperature, wherein
the primary sealing and the secondary sealing are performed by pressing a first case and a second case using a high-temperature sealing tool, and
the first sealing temperature is greater than the second sealing temperature,
wherein the secondary sealing is performed on a part of a primarily sealed portion which has already been sealed to form a venting portion having a low sealing force.

* * * * *